July 22, 1952

R. B. BASHAM ET AL 2,604,181

APPARATUS FOR LOCATING BINDING
AREAS AROUND WELL CASING

Filed Aug. 25, 1948

RAYMOND B. BASHAM
CHARLES W. MACUNE
INVENTORS

BY Herbert J. Brown

ATTORNEY

Patented July 22, 1952

2,604,181

UNITED STATES PATENT OFFICE 2,604,181

APPARATUS FOR LOCATING BINDING AREAS AROUND WELL CASING

Raymond B. Basham and Charles W. Macune, Fort Worth, Tex., assignors to Westronics, Inc., Fort Worth, Tex., a corporation of Texas Application August 25, 1948, Serial No. 46,146

6 Claims. (Cl. 181—.5)

This invention relates to a method and apparatus for locating frozen or bound areas of pipe or well casing beneath the earth's surface. Generally, the invention has to do with recovery of casing from abandoned wells, and has particular reference to locating areas around the casing which have become "frozen" or bound by the presence of cement therearound, lateral shifting of the earth's formations resulting in pressures applied to the outer surface of the casing, or the caving of the well formations wherein rocks form wedges against the casing surface. Such freezing or binding prevents the withdrawal of the casing, and it then becomes necessary to sever the casing above the bound area. The severing operation is performed by explosive means such as radial jet severing recently introduced to the art.

An object of the invention is to provide a method and means for accurately locating frozen or bound areas of well casing below the earth's surface.

Another object of the invention is to measure vibration variations within a relatively short length of well casing for determining the location of bound casing areas, thereby avoiding dissipation of the vibrations as occurs when traveling through the mass of long lengths of casing.

A further object of the invention is to provide vibration energy longitudinally of the well casing for effectively measuring variations of amplitude to determine the presence of bound or frozen areas around the casing surface.

A further object of the invention is to locate frozen or bound areas of a casing in a well while raising and lowering the instrument for that purpose through the well casing.

A further object of the invention is to provide a method and means of locating casing couplings and the like which cause an increase in effective mass around said casing.

The invention is comprised of a vibrator of known frequency and a vibration pick-up arranged in spaced relation with respect to each other and in sliding contact with the inner surface of the casing to be computed for locating frozen or bound areas therearound. Modified forms of the invention may be made wherein there is no actual contact of the apparatus with the inner wall of the casing, but such contact is to be preferred. The vibrator and pick-up are suspended in the casing by means of a cable which also carries electrical leads from the pick-up to the earth's surface where they are connected with recording or other suitable indicating means. When vibration energy is transferred from the vibrator to the well casing, the amplitude passing longitudinally through the casing wall will have an attenuation proportional to the distance from the vibrating source, and will also have amplitude variation due to the various types of formation in contact with the outside of the casing. For example, if the outside of the casing is bound with cement, or is in a tight impacted formation, the amplitude in the affected length of casing will be less than that of a loosely packed formation. By moving the vibrator and its contacting assembly through the casing, ascending or decending, or while standing still, a change in longitudinal vibration amplitude will occur at the frozen area, the amplitude being diminished by the increase in the effective mass of casing and adjacent formation thereagainst.

By using a vibration pick-up, the variation of amplitude may be measured in the length of casing between the casing contacts of the vibrator and the casing contacts of the vibration pick-up. A pick-up spaced less than one-quarter wave length from the vibrator will provide a reasonably short distance between the said units so as to prevent nodal points from appearing between the same when in operation. By energizing the vibrator, transferring the vibration energy to the casing, and determining variations of amplitude reaching the vibration pick-up, and by knowing the relative height of the apparatus within the well casing, the locations of frozen areas about the well casing may be determined. The pick-up may be tuned to the frequency of the vibrator so as to exclude extraneous vibrations. However, a tuned electrical filter may be used for the last referred to purpose.

The vibrator of the invention may be an ordinary buzzer such as used for audible signals, but as will become apparent, a special electromagnet arrangement including a vibrating mass is preferred for imparting vibration energy to the casing. Since longitudinal vibration energy is capable of more clearly defining bound areas along the length of casing than lateral vibration energy, it is preferred that the buzzer or vibrator be disposed in a direction to impart longitudinal vibrations along the length of affected casing.

An embodiment of the invention is illustrated in the accompanying drawing, wherein.

Figure 1:
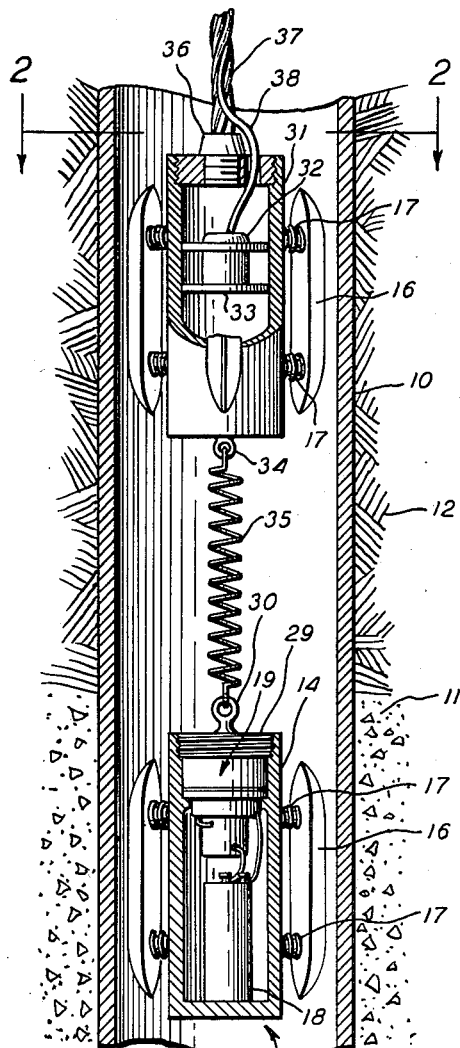
Figure 1 is a vertical sectional view of a length of casing in an earth formation, and showing broken sectional and elevational views of the vibrator assembly and pick-up assembly suspended therein.
Figure 2:
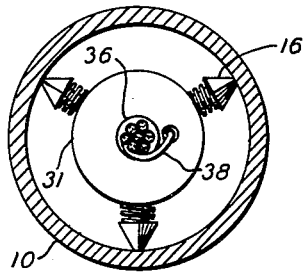
Figure 2 is a lateral sectional view taken on lines 2—2 of Figure 1.

The casing 10, illustrated in Figure 1, is shown bound by cement 11 below the earth formation 12. The apparatus for locating such bound areas of casing includes a vibrator assembly 13 including a cylindrical housing 14, radially extending upper and lower arms 15 secured to the said housing, and skids 16 slidably mounted on and extending beyond the ends of the said arms. The skids 16 are parallel with the axis of the casing 10 and are in contact with the inner wall of the latter by reason of compression springs 17 mounted on the arms 15 between the housing 14 and the said movable skids.

Figure 3:
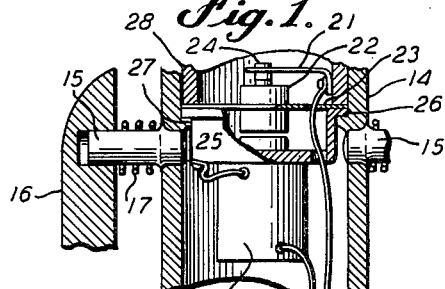
Figure 3 is a broken longitudinal sectional view of a portion of the vibrator assembly and particularly showing means for imparting longitudinal vibration energy to the casing.

Within the vibrator housing 14 a source of electrical power is provided in the form of a dry cell 18 and is electrically connected with a vibrator head 19 mounted in the upper end of the said housing. Details of an exemplary vibrator head 19 are shown in Figure 3 and include a coil 20, a contact arm 21, and an armature 22 mounted on a diaphragm 23 between the said coil and the said arm. It will be noted from the drawing that the axial centers of the coil 20, the armature 22, and the contact 24 of the arm 21 are in the axial center of the housing 14, which, in turn, is within the axial center of the casing 10. The coil 20 is mounted on a cylindrical support 25 having an upper flange 26 which rests upon an internal flange 27 formed in the inner wall of the housing 14. The diaphragm 23 rests upon the flange 26 of the support 25 and is retained by means of a sleeve 28 slidably mounted in the upper end of the housing 14. A threaded adapter 29 is engaged in the upper end of the housing 14 for retaining the sleeve 28 against the diaphragm 23 and for supporting the entire vibrator assembly 13. An eye 30 in the upper center of the adapter 29 is provided for carrying out the supporting arrangement.

Figure 4:
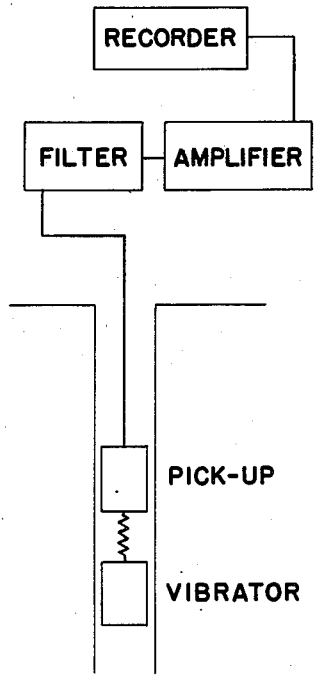
Figure 4 is a block diagram illustrating an arrangement for recording variations of vibration amplitude in the casing between the vibrator and the pick-up.

Above the vibrator assembly 13 there is another housing 31, similar to the first referred to housing 14, which also includes the described radially extending arms 15, outwardly slidable skids 16 at the outer ends thereof, and springs 17 between the said housing and the said skids. Within the housing 31 there is a vibration pick-up 32 mounted on circular supports 33 carried by the inner wall of the housing 31. Beneath the housing 31 there is an eye 34 having a tension spring 35 connected thereto at one of its ends. The other end of the spring 35 is connected with the first referred to eye 30, and the said spring thus provides not only a support for the vibrator assembly 13, but also serves as a vibration filter between the vibrator head 19 and the pick-up 33. The upper end of the pick-up housing 31 is provided with an adapter 36 for engaging a supporting cable 37 extending to the earth's surface. The cable 37 also supports the electrical connections 38 extending to the earth's surface where they are connected with a band pass filter, an amplifier, and a suitable recorder, respectively, as shown in Figure 4.

In operation, the assembly carrying the pick-up 33 and the vibrator assembly 13 suspended therefrom, are raised or lowered through the well casing 10 with the skids 16 in sliding contact with the casing wall. By reason of the described construction of the vibrator assembly, longitudinal vibration energy is imparted to the casing 10 and the vibration amplitude is transmitted therefrom to the skids 16, arms 15, pick-up housing 31 and to the pick-up 33. The vibration imparted to the pick-up 33 is then converted into electrical energy and is transmitted to the earth's surface through the leads 28 where it is filtered, amplified and recorded. The last three referred to devices are conventional and need not be described in detail. It is also to be understood that any suitable indicating means may be substituted therefor.

When the outer area of the casing 10, between the vibrator assembly 13 and the assembly including the pick-up 33, is bound or frozen, as by cement 11, a corresponding attenuation of vibration in the said casing causes a variation of amplitude received at the pick-up 33 and registered at the recorder. When the described assemblies are raised and lowered through the casing 10 it will be apparent that readings may be taken or registered while the apparatus is moving, as well as when standing still.

The described form of the invention is not restrictive, but may be made in many ways within the scope of the appended claims.

What is claimed is:

1. Apparatus for locating a binding area around a well casing, comprising a vibrator having an armature arranged for vertical operation and a pick-up spaced from each other in the well casing, means carried by said vibrator and said pick-up for contacting the inner wall of said casing, and an indicator connected with said pick-up for indicating variations of vibration amplitude in said casing between said vibrator and said pick-up.

2. Apparatus for locating a binding area around a well casing, comprising a vibrator having an armature arranged for vertical operation and a pick-up spaced from each other in the well casing, contacts carried by said vibrator and said pick-up for contacting the inner wall of said casing, and an indicator connected with said pick-up for indicating variations of vibration amplitude in said casing between said vibrator and the said pick-up.

3. Apparatus for locating a binding area around a well casing, comprising a vibrator having an armature arranged for vertical operation and a pick-up spaced from each other in the well casing, skids carried by said vibrator and said pick-up for contacting the inner wall of said casing, and an indicator connected with said pick-up for indicating variations of vibration amplitude in said casing between said vibrator and said pick-up.

4. Apparatus for locating a binding area around a well casing, comprising a vibrator housing, a pick-up housing, a vibration filter connected between the two said housings, a vibrator having an armature arranged for vertical operation in said vibrator housing, a pick-up mounted in the said pick-up housing, contacts mounted on both of said housings for contacting the inner wall of said casing, and an indicator connected with said pick-up for indicating variations of vibration amplitude in said casing between said vibrator and said pick-up.

5. Apparatus for locating a binding area around a well casing, comprising a vibrator housing, a pick-up housing spaced from the said vibrator housing, the said housings being connected for suspension within the well casing by means of a vibration filter, radial arms secured to and extending from said vibrator housing, skids mounted on the said vibrator housing for contacting the inner wall of said casing, a vibrator having an armature arranged for vertical operation mounted in said vibrator housing and disposed for imparting longitudinal vibration energy to the said casing, radial arms secured to and extending from said pick-up housing, skids mounted on the last said arms for contacting the inner wall of said casing, a pick-up mounted in said pick-up housing, and an indicator connected with said pick-up for indicating variations of vibration amplitude in the casing between said vibrator and said pick-up.

6. Appratus for locating a binding area around a well casing, comprising vibrator means and pick-up means spaced from each other in the well casing, means imparting initially longitudinally vibration energy from said vibrator to the said casing, means transmitting the imparted vibration energy from the casing to said pick-up, and indicator means connected with said pick-up for indicating variations of vibration amplitude in the casing between said vibrator and said pick-up.

RAYMOND B. BASHAM.
CHARLES W. MACUNE.

REFERENCES CITED

The following references are of record in the file of this patent:

UNITED STATES PATENTS

| Number | Name | Date |
|---|---|---|
| 1,654,819 | Kinley | Jan. 3, 1928 |
| 2,156,052 | Cooper | Apr. 25, 1939 |
| 2,191,119 | Schlumberger | Feb. 20, 1940 |
| 2,191,120 | Slichter | Feb. 20, 1940 |
| 2,200,476 | Mounce | May 14, 1940 |
| 2,233,992 | Wyckoff | Mar. 4, 1941 |
| 2,265,768 | Athy | Dec. 9, 1941 |
| 2,275,736 | Cloud | Mar. 10, 1942 |
| 2,277,110 | Johnson | Mar. 24, 1942 |
| 2,350,371 | Smith | June 6, 1944 |
| 2,455,940 | Muskat et al. | Dec. 14, 1948 |
| 2,522,433 | Dahlberg, Jr. | Sept. 12, 1950 |